(12) United States Patent  
Kaneko

(10) Patent No.: US 7,926,506 B2  
(45) Date of Patent: Apr. 19, 2011

(54) TANK FLOW PATH STRUCTURE

(75) Inventor: Kenichiro Kaneko, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 654 days.

(21) Appl. No.: 11/604,768

(22) Filed: Nov. 28, 2006

(65) Prior Publication Data  
US 2007/0125427 A1    Jun. 7, 2007

(30) Foreign Application Priority Data

Dec. 2, 2005   (JP) ................................. 2005-349765  
May 18, 2006   (JP) ................................. 2006-138681

(51) Int. Cl.  
*F16K 24/04* (2006.01)

(52) U.S. Cl. ......... 137/202; 251/118; 251/154; 285/179

(58) Field of Classification Search ..................... 137/39, 137/43, 202, 587; 251/118, 144, 153, 154; 285/179  
See application file for complete search history.

(56) References Cited

U.S. PATENT DOCUMENTS

| 2,056,782 | A | * | 10/1936 | Fosdick | ........................ | 138/39 |
| 5,634,673 | A | * | 6/1997 | Miyazaki et al. | .......... | 285/148.5 |
| 6,843,268 | B2 | * | 1/2005 | Yamada et al. | ............... | 137/202 |
| 2005/0211297 | A1 | * | 9/2005 | Frohwein et al. | ............. | 137/202 |

FOREIGN PATENT DOCUMENTS

| JP | 64-32226 U | 2/1989 |
| JP | 11-062725 A | 3/1999 |
| JP | A-11-315765 | 11/1999 |
| JP | 2000-266208 A | 9/2000 |
| JP | A-2002-137641 | 5/2002 |
| JP | 2002-195120 A | 7/2002 |
| JP | 2004-84495 A | 3/2004 |

* cited by examiner

*Primary Examiner* — Craig M Schneider  
(74) *Attorney, Agent, or Firm* — Posz Law Group, PLC

(57) ABSTRACT

The fuel cutoff valve has a connection conduit that connects the connection hole to the approximately round shaped cross section tube passage. With the connection conduit, the connection hole and the flow path area are almost the same, and this comprises a curved passage part that makes the rising gas flow from the connection hole face in the horizontal direction, and a connection passage part that leads the gas flow from the curved passage part to the connection passage part. The fluid guide member that constitutes the curved passage part is a passage that has an inclined face that makes the rising gas flow that flows out from the connection hole face in the horizontal direction, and a passage upper surface formed from a flat surface continuous from the upper edge of the inclined face and arranged above the connection hole. The connection passage part is formed such that the cross section shape of the passage upper surface gradually faces the round shaped cross section of the tube passage.

9 Claims, 11 Drawing Sheets

TANK FLOW PATH STRUCTURE

This application claims the benefit of and priority from Japanese Applications No. 2005-349765 filed Dec. 2, 2005 and No. 2006-138681 filed May 18, 2006, the contents of which are incorporated herein by reference.

BACKGROUND OF THE INVENTION

1. Field of the Invention

The present invention relates to a tank flow path structure that is mounted on the upper part of a fuel tank and is for connecting the inside of the fuel tank to the outside.

2. Description of the Related Art

A tank flow path structure is disclosed in JP-A-2002-137641 and JP-A-11-315765, which is constructed in a fuel cutoff valve for ventilating the inside of the fuel tank to the outside. The fuel cutoff valve is mounted on the upper part of the fuel tank, and comprises a casing with a connection conduit connected to the outside (canister), and a float that rises and falls with the increase and decrease of buoyancy according to the fuel fluid level within the casing valve chamber. The fuel cutoff valve ensures ventilation between the fuel tank interior and the outside during fueling and the like, and prevents fuel in the fuel tank from flowing out canister by closing the connection conduit by the float rising due to an increase in buoyancy with a rise in the fuel fluid level of the fuel tank.

In recent years, to handle the varied and large occupation space of vehicles, flattening of fuel tanks has been studied. However, with the fuel cutoff valves of the prior art, from the design condition of the connection conduit ensuring flow volume of a specified level or greater, the flow path area of the connection conduit is made larger and the hole diameter of the connection hole which is the opening of the connection conduit is also made larger. However, with a connection conduit for which the connection conduit area is made larger in this way, the height direction shape of the fuel cutoff valve is also larger, which hinders the flattening of the fuel tank described above. Also, there is a high possibility of fuel leaking from within the fuel tank because the connection hole is larger.

SUMMARY

An advantage of some aspects of the invention is to provide a tank flow path structure that can flow large flow volume even when the flow path area of the connection conduit is small.

According to an aspect of the invention is provided with a tank flow path structure that comprises a fluid guide member that forms a connection conduit connected with a fuel tank through a connection hole, and a tubular member that has a tube passage connected with the connection conduit. The fluid guide member includes a curved passage part that is disposed above the connection hole and a connection passage part that connects the curved passage part with the tubular member to form a passage for connecting the connection conduit with the tube passage. The curved passage part includes an inclined face that is formed so as to be inclined upward from a part of a periphery portion of the connection hole on a part facing the connection hole, the inclined face being configured such that an outline shape and disposed to face the inclined face is a straight line shape when the inclined face is cut by a plane parallel to a plane containing the connection hole.

The modification of the invention is a tank flow path structure in accordance with claim 1, wherein the inclined face is formed such that the connection conduit is squarely bent.

For the tank flow path structure of the present invention, the fuel vapor within the fuel tank flows from the connection hole through the connection conduit to the outside. The connection conduit has the following constitution to make the pressure loss smaller when fuel vapor within the fuel tank flows out to the outside. Specifically, the connection conduit is positioned above the connection hole, and there is no wall surface or the like that hinders the flow, so the pressure loss is small. Also, the rising gas flow that flows out from the connection hole flows to the outside through a connection passage part that bends in the horizontal direction when flowing within the curved passage part. The rising gas flow that flows out from the connection hole contacts the inclined face of the curved passage part. With the inclined face, the cross section when cut by the face parallel with the face containing the connection hole has a straight line shape, so rather than having the rising gas flow be a flow that focuses on the center part of the curved passage part, this is made to face the connection passage part. Specifically, the gas flow that comes in contact with the inclined face does not have pressure focused locally within the curved passage part, and is led to the connection passage part, so the pressure loss is reduced.

In this way, the connection conduit has low pressure loss for each flow path, and is able to flow a large flow volume even when there is a small flow path surface area. Thus, the tank flow path structure can be constituted with a small flow path surface area, so by lowering the height of the connection conduit, it is possible to contribute to the flattening of the tank device when attaching to the fuel tank.

As a preferred aspect of the present invention, it is possible to have the inclined face be either shape of a flat surface or a curved surface that makes the rising gas flow from the connection hole face in the horizontal direction, and can have the cross section shape have the center of the connection hole be the center of its arc, or have the cross section shape of the arc have as its center a position decentered from the center of the connection hole toward the connection passage part. In this case, the inclined face has the part that faces opposite the connection hole larger, so it is possible to face toward the connection passage part efficiently.

Also, as a preferred aspect of the present invention, it is possible to have the connection passage part have a constitution such that the cross section shape of the curved passage part gradually follows the round shaped cross section of the tube passage. With this constitution, the cross section shape at the location of the curved passage part is not a round shaped cross section like the tube passage, but the connection passage part is formed to have its cross section shape gradually have a smooth connection to the round shaped cross section of the tube passage, so turbulent flow of the gas flow with the connection conduit is eliminated, and pressure loss is decreased.

Also, as another preferred aspect, it is possible to use a constitution comprising a conduit formation member arranged on the upper part of the fuel tank and having the connection hole, a ventilation path main body having a fluid guide member surrounding the conduit formation member and fixed so as to be adhered to the conduit formation member, and a tubular member having the tube passage projecting in the horizontal direction from the ventilation path main body, and formed by a passage groove formed by the fluid guide member and the conduit formation member which is joined to the ventilation path main body and clogs along the passage groove.

Furthermore, as yet another preferred constitution, the conduit formation member comprises a wall main body consisting of a curved surface jutting upward, and a guide projection projecting from the top part of the wall main body, and the guide part has a positioning part that positions the ventilation path main body by insertion to the connection passage part, and a passage formation surface that connects the connection passage part and the tube passage with a smooth surface. The positioning part of the guide part can position the ventilation path main body by insertion to the connection passage part, and the guide part can also constitute the passage formation surface of the connection passage part and flow gas flow smoothly to the tube passage. In this way, in addition to the positioning effect, the guide part also forms part of the connection passage part, so it is possible to simplify its arrangement and constitution.

Also, as another preferred aspect of the present invention, it is possible to constitute this so as to comprise a conduit formation member arranged on the top part of the fuel tank and having the connection hole, a ventilation path main body having the fluid guide member surrounding the conduit formation member and fixed to the outer periphery of the conduit formation member, and a tubular member projecting in the horizontal direction from the ventilation path main body and having the tube passage, and the end part of the fluid guide member is formed on the surface connected to the opening edge of the connection hole. With the fluid guide member using the constitution, it is easy to form a connection conduit connected to the connection hole on the ventilation path main body.

As yet another preferred aspect, it is possible to use a constitution comprising a conduit formation member arranged on the top part of the fuel tank and having the connection holes, a ventilation path main body having a fluid guide member surrounding the conduit formation member and fixed to the outer periphery of the conduit formation member, and a tubular member projecting in the horizontal direction from the ventilation path main body and having the tube passage, and wherein the fluid guide member forms a liquid trap chamber that partitions the space between the ventilation path main body and the conduit formation member in relation to the connection conduit, and in which the fine amount of fuel that leaks from the connection hole is temporarily pooled. With the liquid trap chamber constitution, the fine amount of fuel that leaks from the connection hole is temporarily pooled, and does not flow out to the tube passage from the connection conduit.

Also, another aspect of the present invention is a tank flow path structure that is constructed in a fuel cutoff valve. The fuel cutoff valve includes a casing main body that has an upper wall with the connection hole and a valve chamber, a cover that is attached the upper wall and includes the fluid guide member and the tubular member and a float that is housed within the valve chamber and opens and closes the connection hole by the rise and fall according to a fuel fluid level within the fuel tank.

As with the aspects of the present invention, by blocking communication of the connection conduit that connects the fuel tank interior to the outside, it is possible to suitably apply this to a fuel cutoff valve for ensuring ventilation of the fuel tank interior with the outside and for preventing the outflow of fuel. When using this for this kind of fuel cutoff valve, the flow path resistance of the connection conduit has been reduced, so it is possible to have a small connection hole, and this is advantageous for reopening valve characteristics.

These and other objects, features, aspects, and advantages of the present invention will become more apparent from the following detailed description of the preferred embodiments with the accompanying drawings.

DESCRIPTION OF THE PREFERRED EMBODIMENTS (1) Schematic Structure of Fuel Cut Off Valve 10

Figure 1:
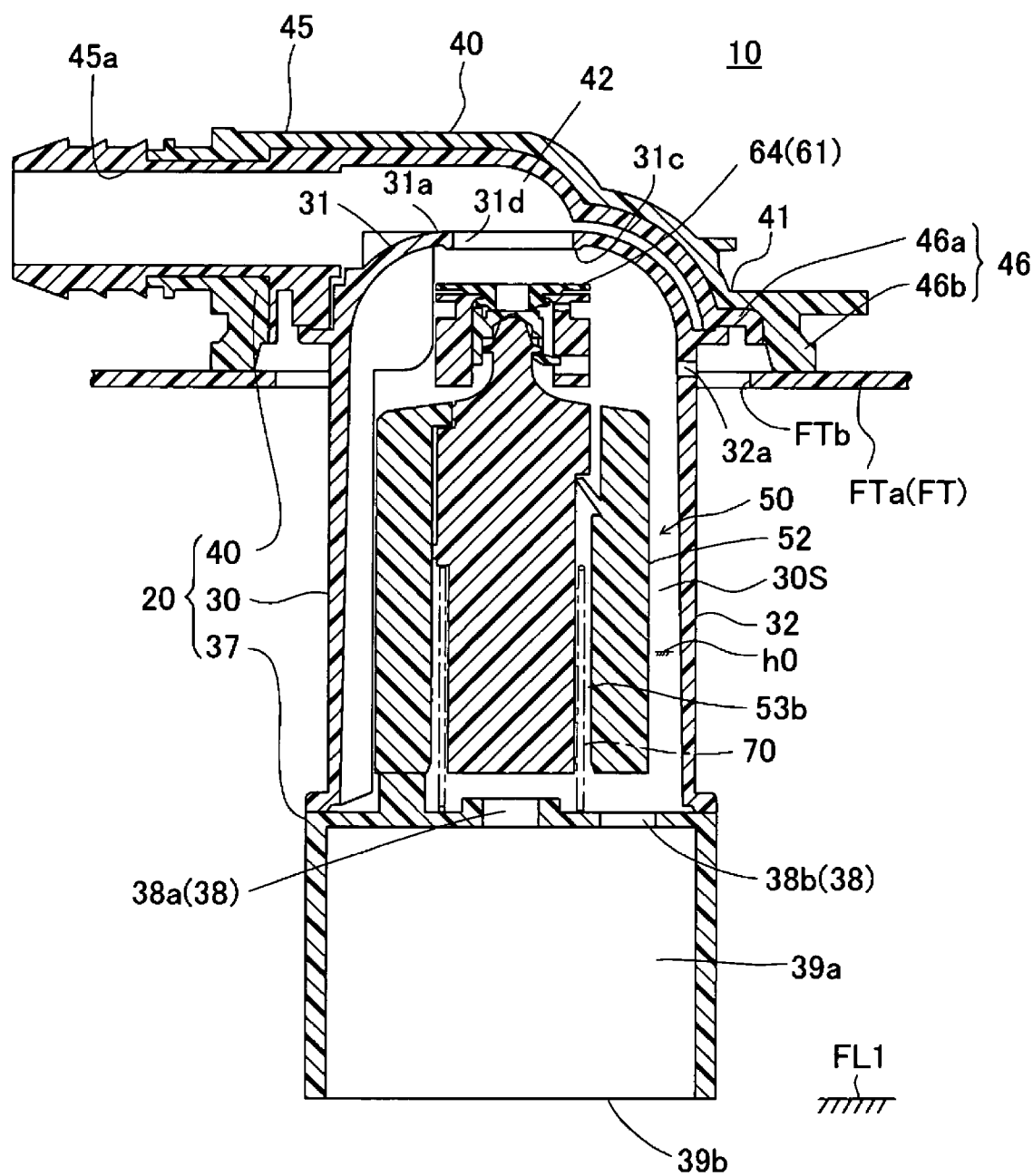
FIG. 1 is a cross section view showing a fuel cutoff valve of a first embodiment of the present invention.

A tank flow path structure of a first embodiment can be suitably applied to a fuel cutoff valve attached to the top part of an automobile fuel tank. FIG. 1 is a cross section view showing the fuel cutoff valve 10. In FIG. 1, A fuel tank FT has its surface formed from a compound resin material containing polyethylene, and has an attachment hole FTb formed on a tank upper wall FTa. The fuel cutoff valve 10 is attached to the tank upper wall FTa in a state with its bottom part penetrating the attachment hole FTb. The fuel cutoff valve 10 comprises in its main constitution a casing 20, a float mechanism 50, and a spring 70. The casing 20 comprises a casing main body 30, a bottom member 37, and a cover 40, and the space enclosed by the casing main body 30 and the bottom member 37 is the valve chamber 30S, and the float mechanism 50 supported by the spring 70 is housed in the valve chamber 30S.

A connection conduit 42 connecting the valve chamber 30S to the outside is formed between the top part of the casing main body 30 and the cover 40. The connection conduit 42 allows the fuel vapor inside the fuel tank FT to escape to the outside through the valve chamber 30S, and also functions as an auto stop by regulating the outflow to the canister when the fuel inside the fuel tank FT rises up to the preset fluid level FL1 during fueling.

(2) Constitution of Each Part of the Fuel Cut Off Valve 10

Figure 2:
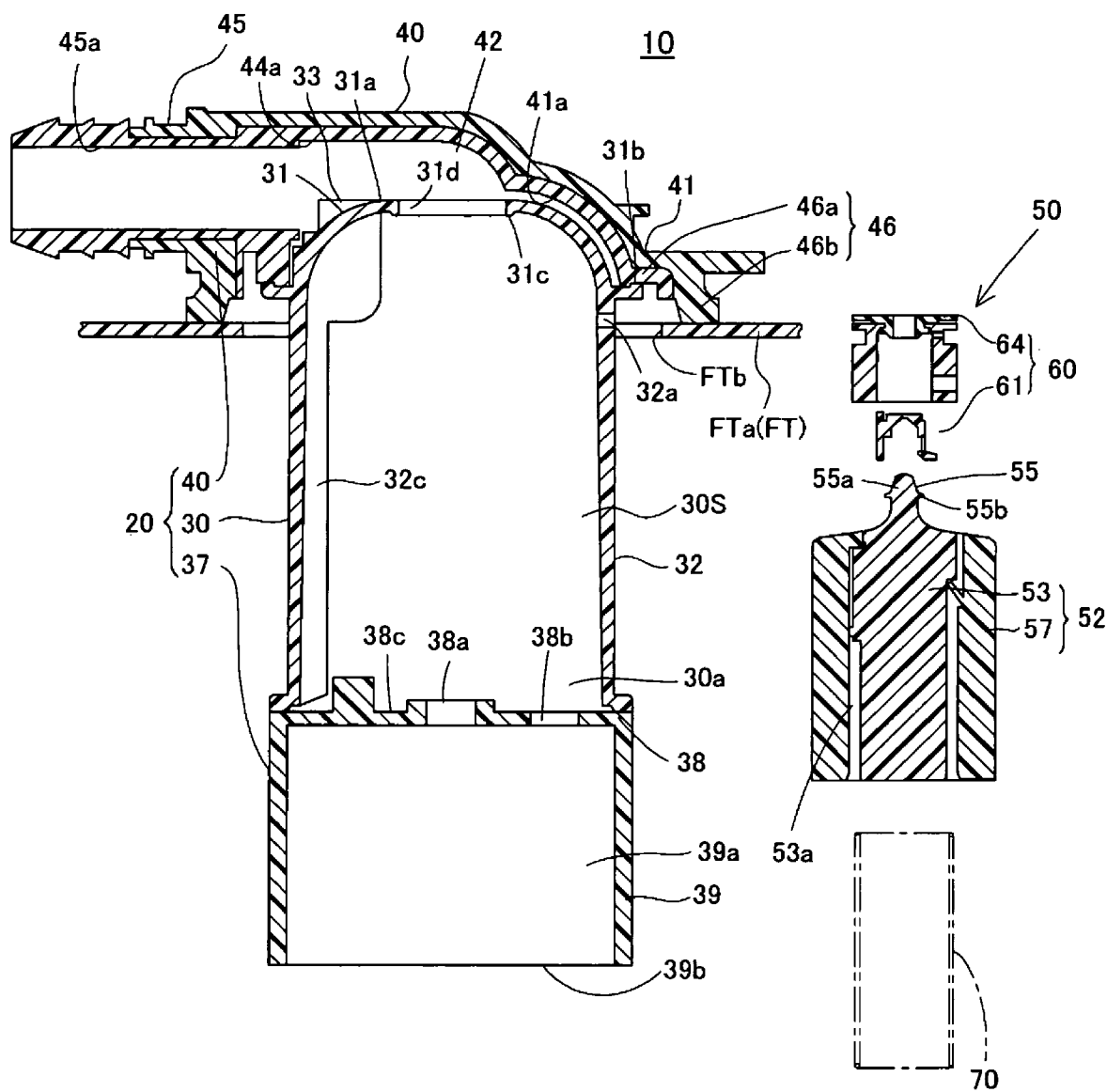
FIG. 2 is a cross section view showing an assembly of the fuel cutoff valve.
Figure 3:
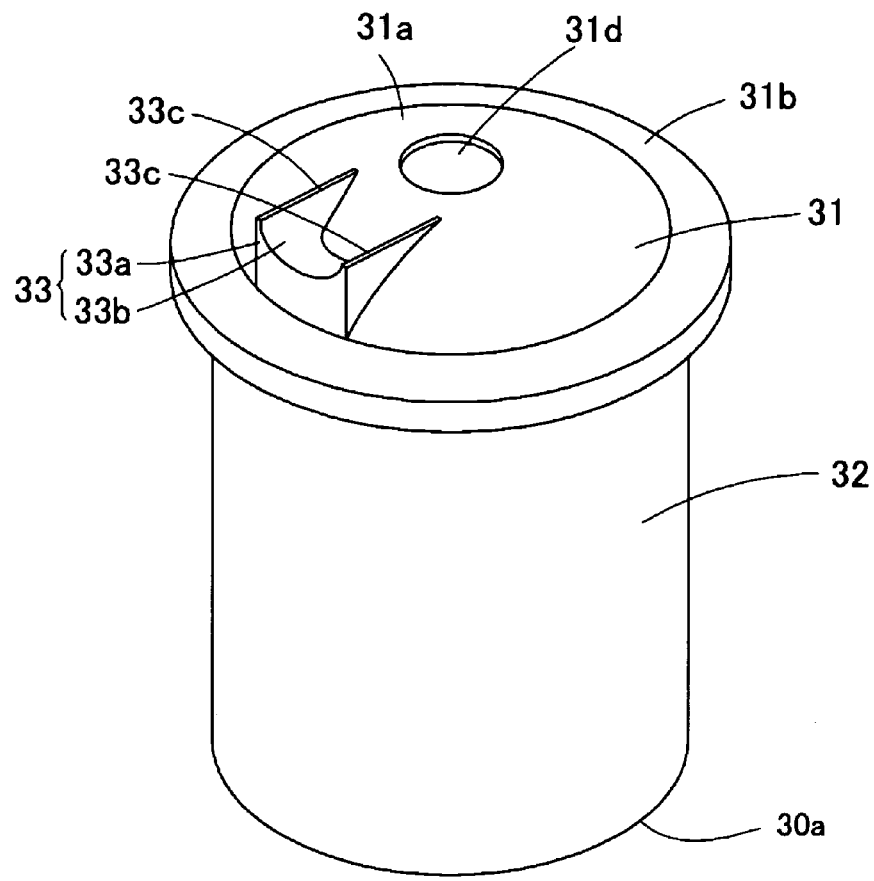
FIG. 3 is a perspective view showing a casing main body.

FIG. 2 is a cross section view showing an assembly of the fuel cutoff valve 10. FIG. 3 is a perspective view showing the casing main body 30. The casing main body 30 has a cup shape enclosed by the conduit formation member 31 that forms an upper wall and a side wall 32, and the bottom part of the casing main body 30 is an opening 30a. The conduit formation member 31 comprises a wall main body 31a formed from a curved surface jutting upward, and an inner welding flange 31b formed along the outer periphery of the wall main body 31a. The connection hole 31d that constitutes part of the connection conduit 42 is formed piercing the center part of the conduit formation member 31. The valve chamber 30S side of the connection hole 31d is a seal part 31c (FIG. 2).

As shown in FIG. 3, the guide projection 33 for positioning the cover 40 is provided projecting at the outer periphery of the conduit formation member 31. The guide projection 33 comprises a positioning part 33a and a passage formation surface 33b that constitutes part of the connection conduit 42. The positioning part 33a is formed from parallel vertical walls 33c, 33c. The passage formation surface 33b is formed in a curved surface between the vertical walls 33c, 33c.

Returning to FIG. 2, a first connection hole 32a that connects the inside of the fuel tank FT and the valve chamber 30S is formed on the upper part of the side wall 32. Four locations of rib 32c provided in the circumferential direction for guiding the float 52 are provided on the inner wall of the side wall 32. The bottom member 37 is a member for closing part of the opening 30a of the casing main body 30, and for introducing the fuel vapor and the liquid fuel into the valve chamber 30S. The bottom member 37 has a bottom plate 38 and a cylindrical portion 39 formed as a single unit, and is welded to the bottom edge of the casing main body 30 at the outer periphery of the bottom plate 38. Passage holes 38a and 38b are formed on the bottom plate 38. On the cylindrical portion 39, provided is an introduction passage 39a, and the fuel vapor and liquid fuel from an introduction opening 39b are led into the valve chamber 30S through the passage holes 38a and 38b.

The cover 40 comprises a cover main body 41 and a tubular member 45 projecting to the side direction from the center of the cover main body 41. The inside of the tubular member 45 becomes a round shaped cross section tube passage 45a, and one end of the tube passage 45a is connected to the valve chamber 30S of the casing main body 30 through the connection conduit 42, and the other end is connected to the canister (illustration omitted). The cover main body 41 comprises a curved cover inner wall 41a and a flange 46 of the outer periphery of the cover inner wall 41a. The flange 46 comprises an inner welding end 46a which welds the inner welding flange 31b of the casing main body 30, and an outer welding element 46b welded to the tank upper wall FTa of the fuel tank FT provided extending at the outer periphery of the inner welding end 46a.

Figure 4:
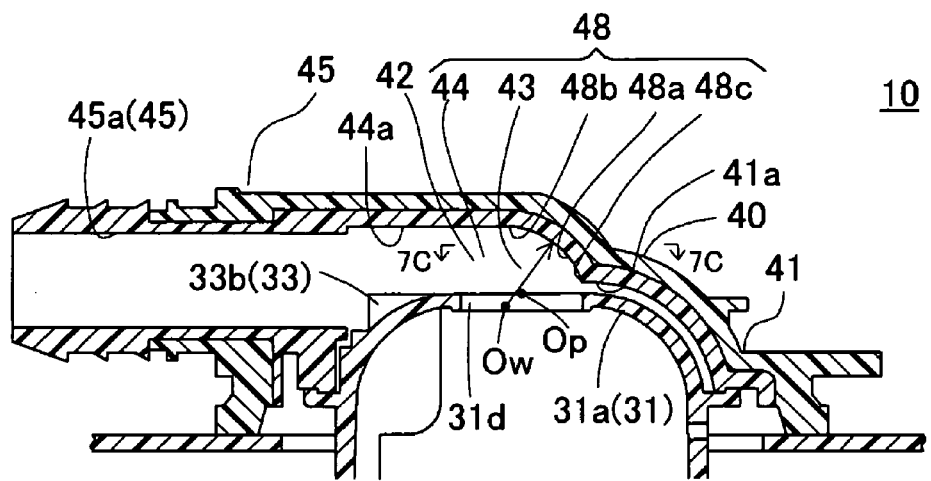
FIG. 4 is a cross section view showing an upper part of the fuel cutoff valve.
Figure 5:
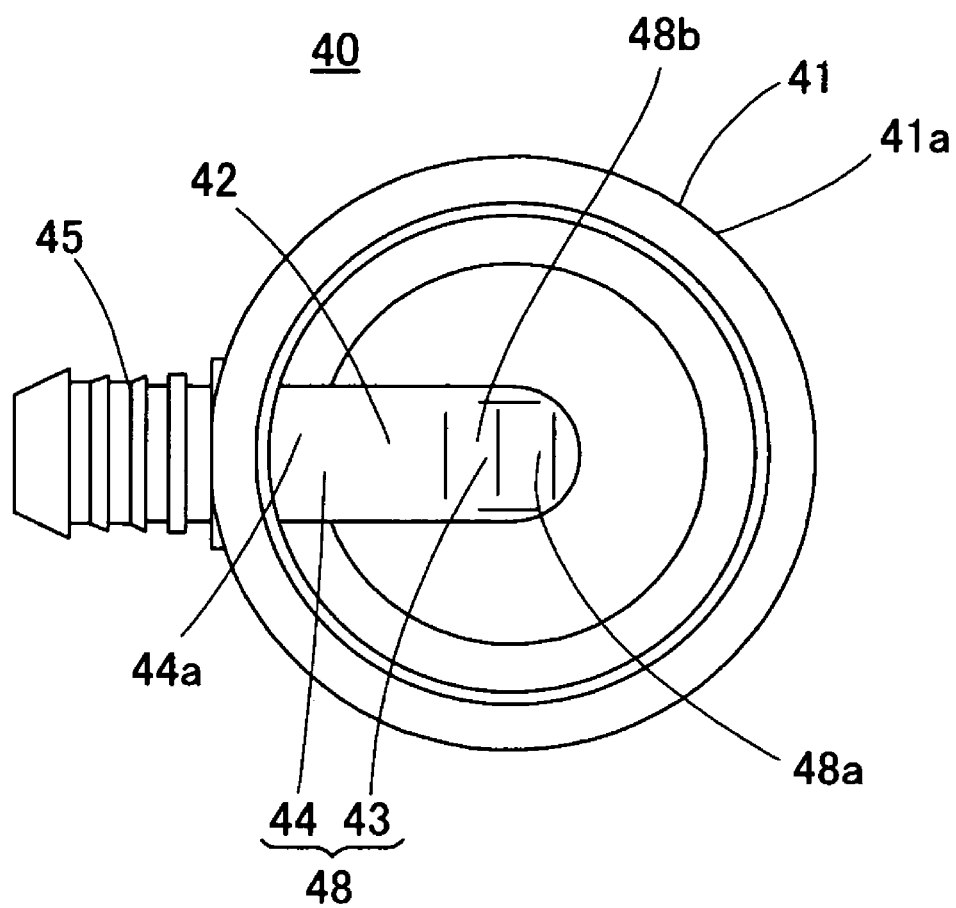
FIG. 5 is a bottom view of a cover.

FIG. 4 is a cross section view showing an upper part of the fuel cutoff valve 10. FIG. 5 is a bottom view of the cover 40. The cover inner wall 41a of the cover 41 (ventilation path main body) is a curved surface that follows part of the sphere, and is formed so as to fit with the wall main body 31a of the conduit formation member 31. The connection conduit 42 is formed between the cover inner wall 41a and the wall main body 31a on the tubular member 45 side.

The connection conduit 42 is connected from the connection hole 31d of the valve chamber 30S to the tube passage 45a, and is a conduit which has almost the same area as the connection hole 31d, and is formed by clogging along the conduit by the passage groove 44a and the wall main body 31a formed on a fluid guide member 48 that constitutes part of the cover main body 41a. The fluid guide member 48 comprises a curved passage part 43 for which the rising gas flow from the connection hole 31d is made to lead in the horizontal direction, and a connection passage part 44 that is connected to the curved passage part 43 and which is arranged in the horizontal direction and leads the gas flow to the tube passage 45a.

The fluid guide member 48 comprises the inclined face 48a connected to the connection hole 31d, and the passage upper surface 48b formed from the flat surface arranged above the connection hole 31d. The inclined face 48a is formed as a surface facing opposite the connection hole 31d of the curved passage part 43, in other words, it is formed so as to be inclined upward from the peripheral edge part of the connection hole 31d. The arc shape of the inclined face 48a is a shape with the center Ow decentered from the center Op of the connection hole 31d in the tube passage 45a and in the downward direction as the center of the arc. Also, the end portion 48c which is the bottom end of the fluid guide member 48 is formed on the surface connected to the opening edge of the connection hole 31d.

Figure 6:
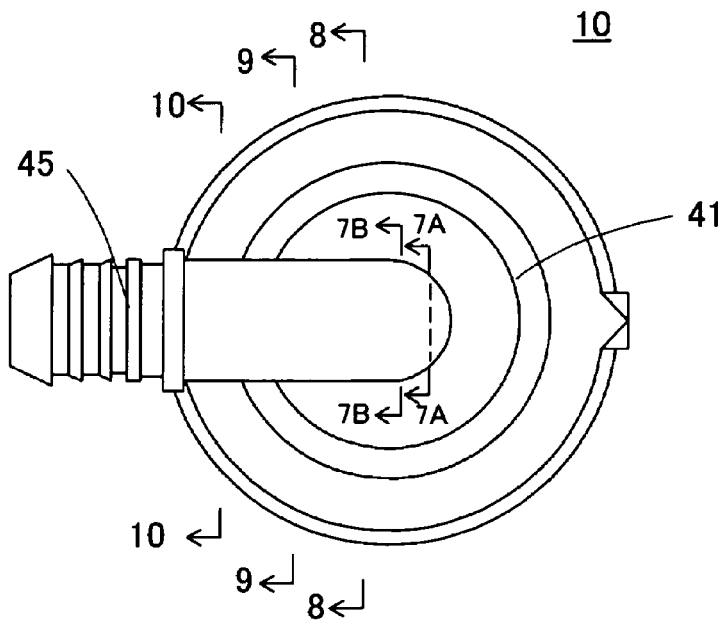
FIG. 6 is a plan view of the fuel cutoff valve.
Figure 7A:
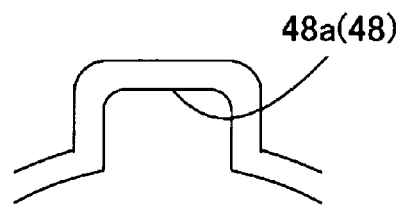
FIGS. 7A, 7B and 7C show the shape of the inclined face.
Figure 7B:
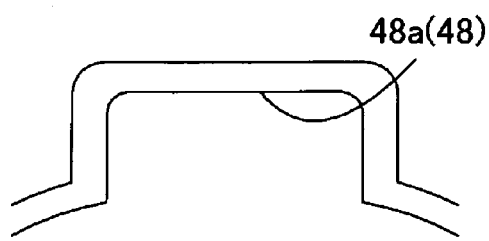
Figure 7C:
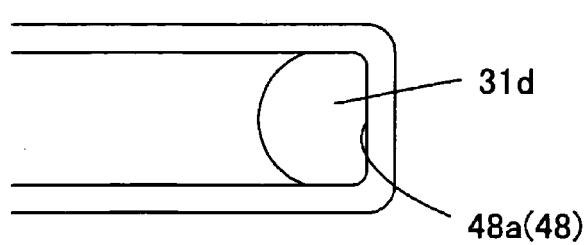
Figure 8:
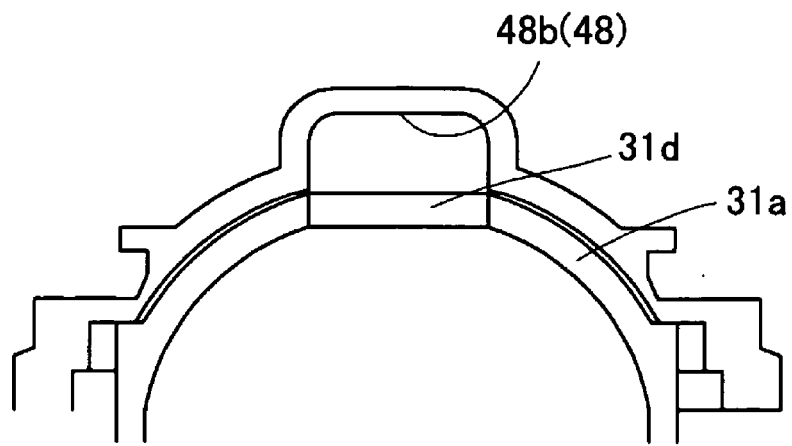
FIG. 8 is a cross section view along line 8-8 of FIG. 6.
Figure 9:
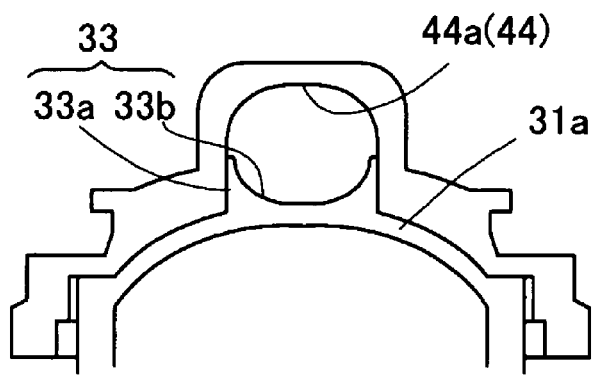
FIG. 9 is a cross section view along line 9-9 of FIG. 6.
Figure 10:
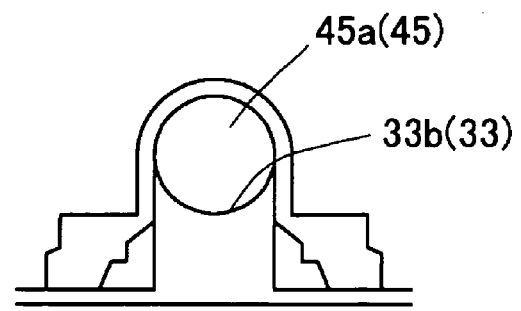
FIG. 10 is a cross section view along line 10-10 of FIG. 6.

FIG. 6 is a plan view of the fuel cutoff valve 10, FIG. 7 is an expanded cross section view along lines 7A-7A and 7B-7B of FIG. 6 and a cross section view along line 7C-7C, and FIG. 8 through FIG. 10 are cross section views respectively along line 8-8, line 9-9, and line 10-10 of FIG. 6. As shown in FIGS. 7A and 7B, the inclined face 48a is constituted so that the cross section cut by the surface vertical to the axis line of the tube passage 48a forms a straight line shape. To say this another way, as shown in FIG. 7C, the cross section cut by the surface parallel with the surface containing the connection hole 31d is constituted so as to form a straight line shape, and by doing this, there is an effect of making the rising gas flow that flows out from the connection hole 31d face in the horizontal direction.

As shown in FIG. 8, the passage upper face 48b which constitutes the fluid guide member 48 is connected from the top end of the inclined face 48a and is formed as a flat surface arranged facing above part of the connection hole 31d. As shown in FIG. 9 and FIG. 10, the connection passage part 44 is formed such that the cross section shape of the passage upper surface 48b gradually faces the round shaped cross section of the tube passage 45a. Specifically, the passage groove 44a has a smooth curved surface so that the passage upper surface 48b which is a flat surface connects to the round shaped cross section tube passage 45a so that the deformed cross section gradually approaches a round shape. Also, the wall main body 31a constitutes the connection passage part 44 by clogging the passage groove 44a, and is formed so as to be connected with a curved surface connected with the round shaped cross section tube passage 45a by the passage formation surface 33b formed on the upper surface of the guide projection 33. Note that with this kind of constitution, the connection conduit 42 has the valve chamber 30S connected to the canister side, and the effect of this is described later.

As shown in FIG. 2, the float mechanism 50 is a two level valve mechanism with improved reopening valve characteristics, and comprises a float 52 and an upper valve unit 60 arranged on the top part of the float 52. The float 52 comprises a first float body 53 and a second float body 57, and has these combined as a single unit. A valve support part 55 is provided projecting on the top part of the first float body 53. The valve support part 55 comprises a support projection 55a that is a part for supporting the upper valve unit 60 to be able to turn at the neck, and is an almost cone shaped projection (convex shape), and a ring shaped projection 55b is formed to retain the upper valve unit 60 at the outer periphery of the valve support part 55. A spring storage space 53a is provided in the gap between the outer periphery of the first float body 53 and the inner periphery of the second float body 57, and a spring 70 is installed in the spring storage space 53a.

Figure 11:
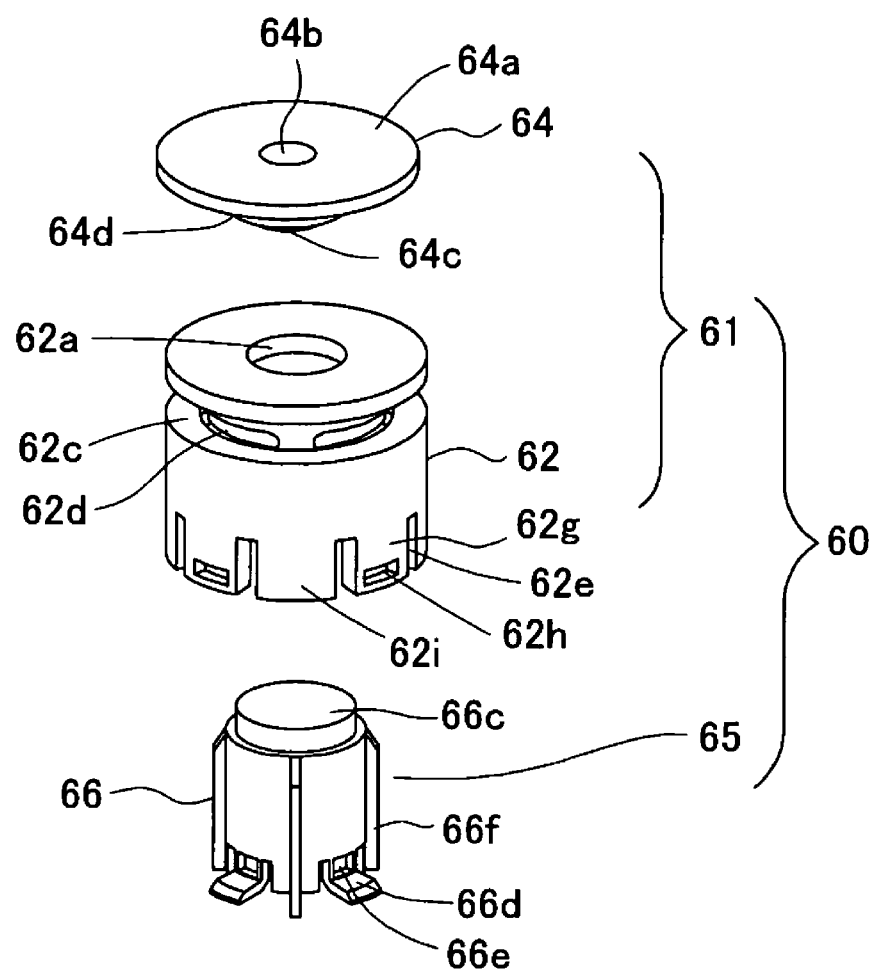
FIG. 11 is a perspective view showing an assembly of a first valve element and a second valve element of an upper valve unit.
Figure 12:
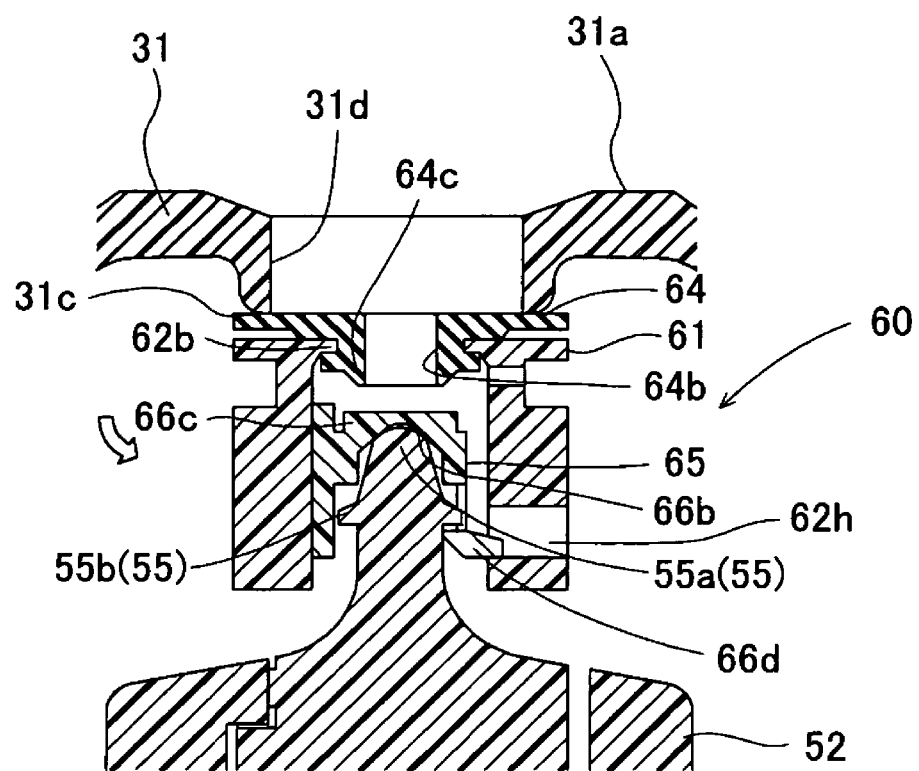
FIG. 12 is a cross section view showing the upper valve unit.

The upper valve unit 60 is a valve for opening and closing the connection conduit 42 and for improving the reopening valve characteristics, and is supported so as to be able to rise and fall as well as to be able to turn at the neck on the valve support part 55 of the float 52. FIG. 11 is a perspective view showing an assembly of the first valve element 61 and the second valve element 65 that constitute the upper valve unit 60, and FIG. 12 is a cross section view showing the upper valve unit 60. The first valve element 61 comprises an almost cylindrical first valve member 62 and a seat part material 64. A support end hole 62a is formed in the axial direction inside the first valve member 62. A fixation element 62b for attaching the seat part material 64 is formed on the top part of the first valve member 62. A ring shaped recess 62c is formed on the outer peripheral part of the first valve member 62, and four locations of vents 62d for connecting the support end hole 62a to the outside are formed on that ring shaped recess 62c. A slit 62e is formed on the bottom part of the first valve member 62, and with the slit 62e, the engagement piece 62g is formed to be flexibly deformable from the fastness splinter 62i. A fitting hole 62h is formed on the engagement piece 62g.

The seat part material 64 comprises a first seat 64a detachable with the seal part 31c, a connection hole 64b connected to the support end hole 62a, a seal part 64c formed on the bottom end part of the connection hole 64b, and a fixation element 64d, and is molded into a single unit using a rubber material. The seat part material 64 is mounted on the fixation element 62b of the first valve member 62 with the fixation element 64d, and by the first seat 64a having a gap in relation to the top surface of the first valve member 62, the sealing properties are increased by flexible deformation when seating on the seal part 31c.

In FIG. 11 and FIG. 12, the second valve element 65 comprises a cylindrical shaped second valve member 66. A hole with a bottom that opens downward is formed on the second valve member 66, and a concave shaped support member 66b is formed on the bottom center part of the hole with a bottom. With the support member 66b, by placing this on the valve support part 55 of the float 52, the second valve element 65 is supported to be able to turn its neck with the valve support part 55 as the point of support.

Also, the second seat 66c is formed on the top surface of the second valve member 66, and the second seat 66c is formed so as to open and close the connection hole 64b by detaching with the seal part 64c of the first valve element 61. Four locations of nuts 66d are formed on the bottom part of the second valve member 66, and by fitting in the fitting hole 62h of the first valve member 62, the first valve element 61 is supported to be able to rise and fall in relation to the second valve element. A fitting hole 66e is formed on the top part of each nut 66d, and by fitting this in the ring shaped projection 55b of the float 52, the second valve element 65 is supported and retained to be able to rise and fall in relation to the float 52. Also, at the outer periphery part of the second valve member 66 is formed a guide rib 66f for guiding the second valve element 65 in the up and down direction. The guide rib 66f is provided projecting in a rib shape in the up and down direction at four locations at equal intervals in the circumferential direction on the side wall of the second valve member 66, and can slide on the inner wall surface of the support end hole 62a.

Also, the center of gravity of the upper valve unit 60 is set downward from the support member 66b. As a constitution for this, the fastness splinter 62i is formed to make the downward weight greater. Also, by making the valve support part 55 into a convex shape and the support member 66b into a concave shape, center matching of the upper valve unit 60 and the float 52 can be done easily, and it is easy to set the center of gravity downward in relation to the point of support, so the orientation of the upper valve unit 60 is stable.

(3) Fuel Cut Off Valve Imposition Work

In FIG. 2, to impose the fuel cutoff valve 10, after imposing the float mechanism 50 inside the valve chamber 30S of the casing main body 30, the outer peripheral part of the bottom plate 38 is welded to the bottom part of the casing main body 30. Furthermore, the inner welding flange 31b of the casing main body 30 and the inner welding end 46a of the cover 40 are heated using a hot plate or the like, and furthermore, the casing main body 30 and the cover 40 are positioned by matching and inserting the positioning part 33a of the casing main body 30 to the passage groove 44a of the cover 40, and welding to make a single unit.

(4) Fuel Cut Off Valve 10 Operation

Next, the operation of the fuel cutoff valve 10 is described. As shown in FIG. 1, when fuel is supplied inside the fuel tank FT by fueling, as the fuel fluid level inside the fuel tank FT rises, the fuel vapor pooled on the top part within the fuel tank FT flows into the valve chamber 30S from the passage hole 38a and the passage hole 38b via the introduction passage 39a of the cylindrical portion 39. Furthermore, the fuel vapor escapes to the canister side from the valve chamber 30S through the connection conduit 42 and the tube passage 45a. Then, when the fuel fluid level within the fuel tank FT reaches the preset fluid level FL1, by the fuel clogging the introduction opening 39b, the tank internal pressure within the fuel tank FT rises. In this state, the pressure difference between the tank internal pressure and the pressure inside the valve chamber 30S becomes large, and the liquid fuel flows into the valve chamber 30S through the introduction passage 39a and the passage holes 38a and 38b, and the fuel fluid level rises within the valve chamber 30S. When the fuel fluid level within the valve chamber 30S reaches height h0, through a balance between the force upward due to the buoyancy of the float 52 and the load of the spring 70 and the force downward due to the empty weight of the float mechanism 50, the former goes higher than the latter, becoming a single unit with the float mechanism 50 and rising, and the seat part material 64 of the first valve element 61 is seated on the seal part 31c and closes the connection hole 31d. At this time, fuel pools inside the inlet pipe, and when the fuel touches a fueling gun, auto stop is set in motion. By doing this, when fueling a fuel tank or the like, it is possible to have the fuel vapor escape from the fuel tank and also to prevent the outflow of fuel to outside the fuel tank.

Meanwhile, the fuel inside the fuel tank FT is consumed, and when the fuel fluid level drops, as shown in FIG. 12, the float 52 buoyancy decreases and it drops. By the dropping of the float 52, through the engagement of the nut 66d of the second valve element 65 and the ring shaped projection 55b of the float 52, the float 52 pulls down the second valve element 65. By doing this, the second seat 66c is separated from the seal part 64c and opens the connection hole 64b. With the connection of the connection hole 64b, the downward pressure of the first valve element 61 becomes the same pressure as near the connection conduit 42. Because the nut 66d is engaged with the fitting hold 62h, the first valve element 61 is also pulled down via the second valve element 65. Then, by the first valve element dropping, the seat part material 64 is separated from the seal part 31c, and the connection conduit 42 opens. By setting the passage surface area of the connection hole 64b to be smaller than the passage surface area of the connection hole 31d, the upper valve unit 60 opens the valve with a small force, and operates so as to promote improvement in the reopening valve characteristics.

(5) Operation and Effect of the Embodiment

Figure 13:
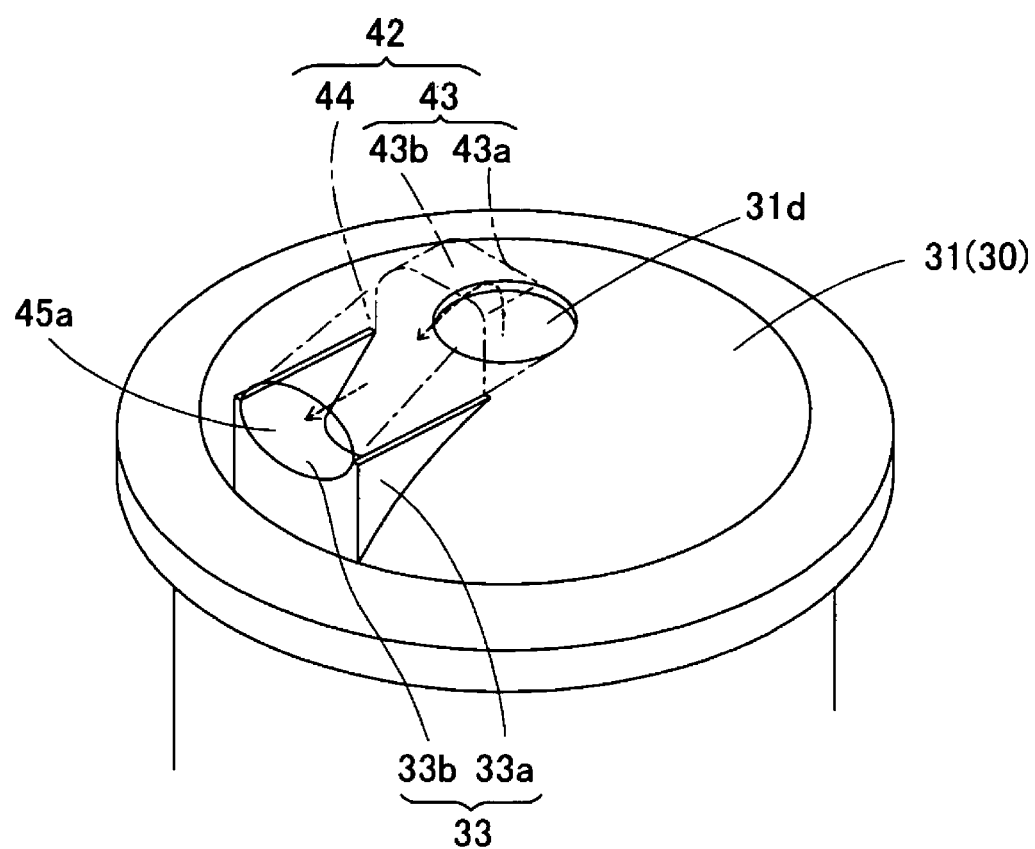
FIG. 13 shows the effect of the connection conduit of the fuel cutoff valve.

The operation and effect of the connection conduit 42 of this embodiment is described using FIG. 13.

(5)-1 As shown in FIG. 1, when the fuel fluid level of the fuel tank FT rises due to fueling, the fuel vapor within the fuel tank flows to the outside from the valve chamber 30S through the connection hole 31d, the connection conduit 42, and the tube passage 45a. In FIG. 13, the connection conduit 42 is constituted from the curved passage part 43 for which the flow path surface area is almost the same as the connection hole 31d and from the connection passage part 44, so there is no wall surface or the like that hinders flow, and there is little pressure loss.

(5)-2 The rising gas flow that flows out from the connection hole 31d bends in the horizontal direction when it flows within the curved passage part 43, and flows to the outside from the connection passage 44 through the tube passage 45a. Part of the rising gas flow that flowed out from the connection hole 31d contacts the inclined face 48a of the fluid guide member 48, and the other rising gas flow contacts the passage upper surface 48b. The inclined face 48a is a curved surface arranged facing opposite the connection hole 31d as shown in FIG. 7, and is a straight line shaped surface when cut by the surface (horizontal surface) parallel with the connection hole 31d, so without having the rising gas flow be a flow focused at the center part of the curved passage part 43, the rising gas flow flows to the connection passage part 44 with little pressure loss. Specifically, the gas flow that contacted the inclined face 48a is led to the connection passage part 44 without focusing the pressure locally within the curved passage part 43, so the pressure loss is reduced.

(5)-3 The cross section shape at the location of the passage upper surface 48b of the curved passage part 43 is not a round shaped cross section like the tube passage 45a, but the connection passage part 44 is formed so its cross section shape gradually smoothly connects to the round shaped cross section of the tube passage 45a, so turbulent flow of the gas flow within the connection conduit 42 is eliminated, and the pressure loss is reduced.

(5)-4 The connection conduit 42 is able to flow a large flow volume even with a small flow path surface area with little pressure loss. Thus, the fuel cutoff valve 10 can be constituted with a small flow path surface area, so by lowering the height of the connection conduit 42, it is possible to contribute to the flattening of the tank device when attaching to a fuel tank.

(5)-5 The connection conduit 42 is able to have little pressure loss and a small conduit surface area of the connection hole 31d which is the opening, so it is possible to use little force for the upper valve unit 60 to open, and it is possible to improve the reopening valve characteristics.

(5)-6 As shown in FIG. 3, the positioning part 33a of the guide projection 33 blocks rotation of the direction of the casing main body 30 and the cover 40, and makes the imposition work simple. Also, the passage formation surface 33b that connects from the curved surface of the conduit formation member 31 and is smoothly connected is provided, so in addition to contributing to lowering the height of the connection conduit 42, the gas flow from the connection conduit 42 to the tube passage 45a is rectified, and thus it is possible to reduce the pressure loss.

Figure 14:
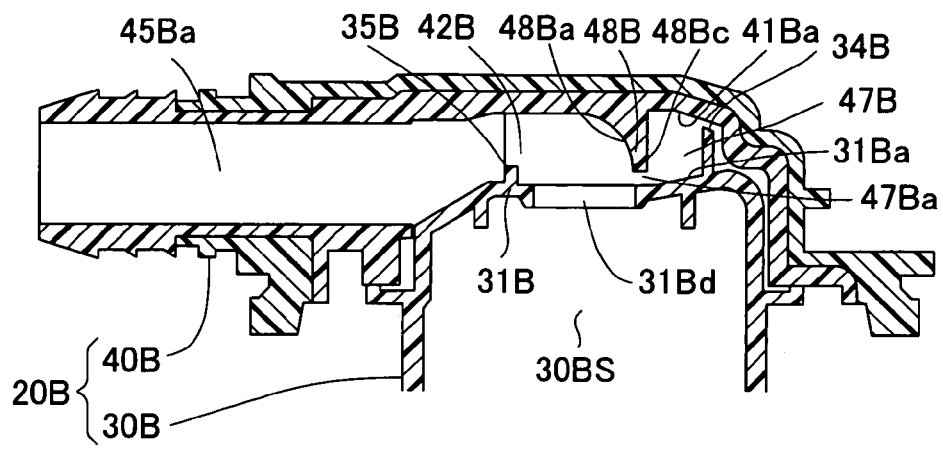
FIG. 14 is a cross section view showing the top part of the casing of a fuel cutoff valve of a second embodiment.
Figure 15:
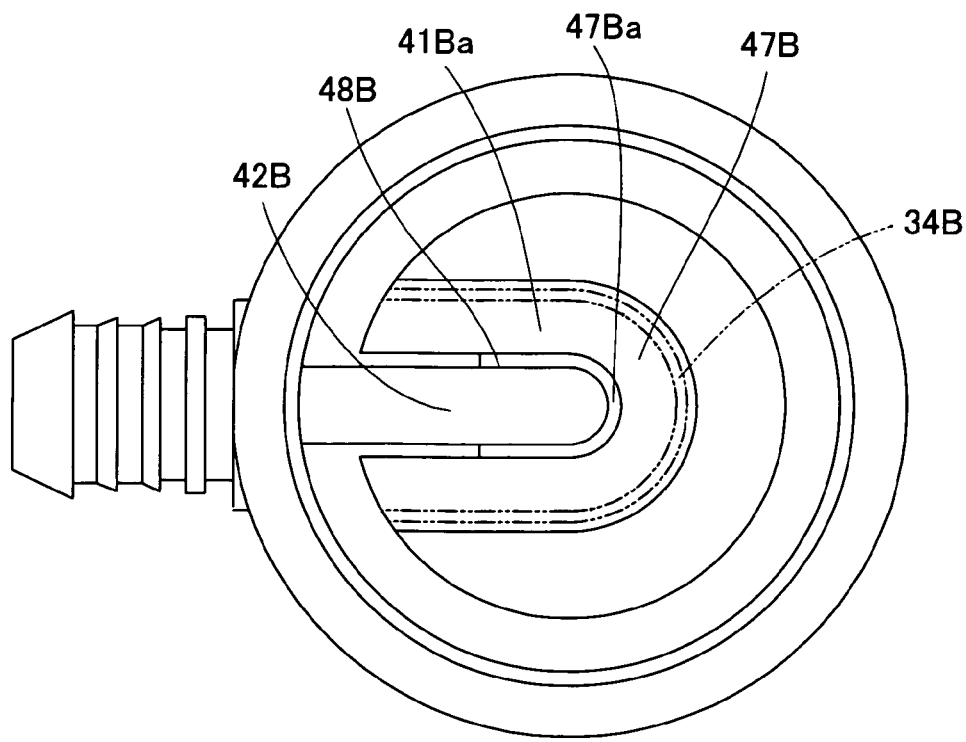
FIG. 15 is a bottom view of a cover.

FIG. 14 is a cross section view showing the top part of the casing 20B of the fuel cutoff valve 10B of the second embodiment, and FIG. 15 is a drawing viewing the cover 40B from the bottom. This embodiment has as its feature the constitution of providing a liquid trap chamber in which fuel leaked from the connection hole is temporarily pooled. Specifically, the fluid guide member 48B is provided standing beneath the cover inner wall 41Ba of the cover 40B (ventilation path main body). The fluid guide member 48B partitions the concave locations formed by the curved surface of the cover inner wall 41Ba, in other words that concave location is partitioned into the connection conduit 42B formed at the side direction from the center side of the cover 40B and the liquid trap chamber 47B formed at the outer periphery side of the connection conduit 42B. The fluid guide member 48B comprises an end portion 48Bc connected with the opening edge of the connection hole 31Bd, and furthermore, on the surface positioned above the connection hole 31Bd is formed the inclined face 48Ba that makes the gas flow from the connection hole 31Bd face the curved direction.

The liquid trap chamber 47B is a chamber for temporarily pooling fuel leaked in tiny amounts from the connection hole 31Bd and for returning it to the valve chamber 30BS through the connection hole 31Bd, and is formed by being enclosed by the fluid guide member 48B outer wall, the cover inner wall 41Ba, the wall main body 31Ba of the casing main body 30B, and the inner wall of the chamber formation projection 34B provided projecting upward from the outer periphery part of the wall main body 31Ba. A gap is formed between the bottom end of the fluid guide member 48B and the wall main body 31Ba, and the gap is the trap opening 47Ba that connects the connection conduit 42B and the liquid trap chamber 47B. Also, a weir 35B is provided projecting on the tube passage 45Ba side which is above the wall main body 31Ba. The weir 35B encloses part of the connection hole 31Bd and is provided projecting to the height of the top part of the trap opening 47Ba, and it is formed so as to lead fine amounts of fuel leaked from the connection hole 31Bd from the liquid trap chamber 47B so as not to flow out to the tube passage 45Ba.

Next, the operation of the liquid trap chamber 47B is described. During fueling or by lateral shaking of the vehicle, when fuel rippling or a delay in the operation of the float mechanism occurs, the fuel within the fuel tank fills the valve chamber 30BS, and there is further a fine amount of fuel leakage from the connection hole 31d, the leaked fuel outflow to the tube passage 45Ba is regulated by the weir 35B, and passes through the trap opening 47Ba and is pooled in the liquid trap chamber 47B. Then, when the fuel fluid level near the connection hole 31Bd decreases and the float mechanism drops, the fuel pooled in the liquid trap chamber 47B returns to the fuel tank through the connection hole 31Bd and the valve chamber 30BS from the trap opening 47Ba. Therefore, the fine amount of fuel leaked from the connection hole 31Bd is temporarily pooled in the liquid trap chamber 47B, and it is possible to prevent outflow to the canister through the tube passage 45Ba.

Figure 16:
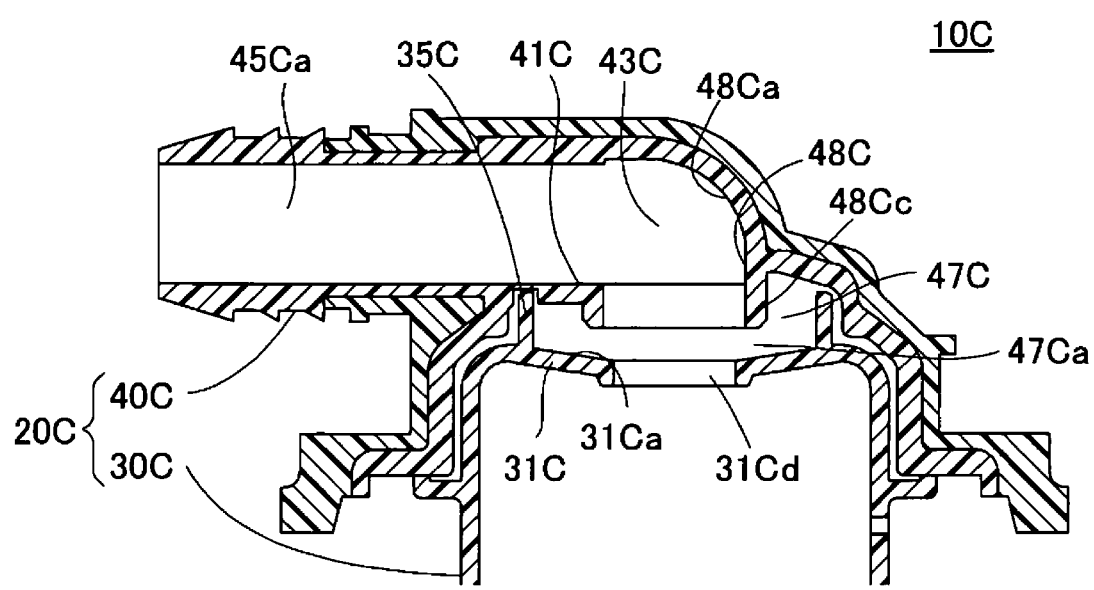
FIG. 16 is a cross section view showing an upper part of the casing of the fuel cutoff valve of a third embodiment.

FIG. 16 is a cross section view showing the top part of the casing 20C of the fuel cutoff valve 10C of the third embodiment. This embodiment has as its feature the constitution of the liquid trap chamber 47C. Specifically, the liquid trap chamber 47C has a space formed between the top part of the casing main body 30C and the cover main body 41C of the cover 40C (ventilation path main body), in other words, it is surrounded by the top surface of the wall main body 31Ca that constitutes the conduit formation member 31C, the weir 35C provided standing from the wall main body 31Ca, the bottom surface of the cover main body 41C, and the end portion 48Cc of the bottom part of the fluid guide member 48C extending to the entire outer peripheral side of the connection hole 31Cd. The end portion 48Cc has a cylindrical shape, and is formed having the same inner diameter or a slightly larger inner diameter than that of the connection hole 31Cd so as to enclose the connection hole 31Cd. The liquid trap chamber 47C is connected to the connection hole 31Cd via the trap opening 47Ca formed at the bottom part of the fluid guide member 48C. Also, the wall main body 31Ca is an inclined face inclined upward as it faces the connection hole 31Cd. Furthermore, the tube passage 45Ca that is curved in the horizontal direction is provided projecting on the top surface of the cover main body 41C. With this mechanism, the fine amount of fuel leaked from the connection hole 31Cd is temporarily pooled in the liquid trap chamber 47C and does not flow out to the tube passage 45Ca.

Note that this invention is not limited to the embodiments noted above, and it is possible to implement various aspects in a scope that does not stray from the key points, for example, the following variations are possible.

The tank flow path structure of the embodiments noted above used a full tank regulating valve that closes the connection conduit when at the full tank fluid level during fueling, but the invention is not limited to this, and it is also possible to use a roll over valve that prevents outflow of the fuel tank when the vehicle is at an incline or the like.

Furthermore, in addition to the fuel cutoff valve, the tank flow path structure can be used for various types of tank joints or the like for ventilating the fuel vapor to the outside such as a filler pipe circulation loop or the like.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A tank flow path structure that comprises
a conduit formation member that has a connection hole; and
a cover that includes (i) a cover main body attached to the conduit formation member, (ii) a fluid guide member that projects from the cover main body and forms a connection conduit connected with a fuel tank through the connection hole, and (iii) a tubular member that forms a tube passage connected with the connection conduit,
wherein the fluid guide member includes (i) a curved passage part that is disposed above the connection hole and (ii) a connection passage part that connects the curved passage part with the tubular member,
wherein a lower end portion of the curved passage part conforms to an opening peripheral part of the connection hole, and
wherein the curved passage part includes an inclined face that is formed to be inclined upward from a part of a periphery portion of the connection hole and disposed to face the connection hole, the inclined face being configured such that an outline shape on the inclined face is a straight line shape when the inclined face is cut by a plane parallel to a plane containing the connection hole, and is formed such that the connection conduit is squarely bent, wherein the area of the connection conduit is substantially the same as that of the connection hole,
the connection conduit is formed to be simultaneously surrounded by the cover main body and the connection passage part, and
the connection passage part is formed such that a non-round shaped cross section of the connection conduit gradually follows a round shaped cross section of the tube passage.

2. The tank flow path structure in accordance with claim 1, wherein the inclined face has an arc cross section shape when the inclined face is cut by a vertical plane, a center of the arc cross section shape being a point that is decentered from a center of the connection hole in a direction of the connection passage part.

3. The tank flow path structure in accordance with claim 1, wherein
the conduit formation member is arranged on an upper part of the fuel tank, and
the connection conduit is formed such that a passage groove formed on a ventilation path main body is covered with the conduit formation member, the ventilation path main body being configured to be fixed to an outer circumference of the conduit formation member and to conform to the conduit formation member.

4. The tank flow path structure in accordance with claim 3, wherein the conduit formation member includes a wall main body with a curved surface jutting upward, and the ventilation path main body includes a cover inner wall that fits the curved surface.

5. The tank flow path structure in accordance with claim 3, wherein
the conduit formation member includes a wall main body with a curved surface jutting upward, and a guide projection projecting from an upper part of the wall main body,
wherein the guide projection has (i) a positioning part that is inserted into the passage groove and positions the ventilation path main body on the conduit formation member, and a passage formation surface that connects a passage of the connection passage part and the tube passage with a smooth surface.

6. The tank flow path structure in accordance with claim 5, wherein
the tube passage has a round shaped cross section, and the passage formation surface has a U shaped cross section that conforms to a part of the round shaped cross section.

7. The tank flow path structure in accordance with claim 1, further comprising a liquid trap chamber,
wherein the liquid trap chamber is separated from the connection conduit by the fluid guide member, and is connected with the connection conduit through a passage formed under a lower portion of the fluid guide member, and temporarily pools a fuel flowing out of the connection hole through the passage.

8. The tank flow path structure in accordance with claim 7, wherein the liquid trap chamber is surrounded by a conduit formation member with the connection hole and a cover main body with the tubular member, the conduit formation member fitting the cover main body.

9. The tank flow path structure in accordance with claim 1, wherein
the tank flow path structure is constructed in a fuel cutoff valve, wherein
the fuel cutoff valve includes:

a casing main body that has an upper wall with the connection hole and a side wall projecting from an outer circumference of the upper wall, and a valve chamber formed with the upper wall and the side wall;

a cover that is attached to the upper wall, and includes the fluid guide member and the tubular member; and a float that is housed within the valve chamber, and opens and closes the connection hole by the rise and fall according to a fuel fluid level within the fuel tank.

* * * * *